2,056,950

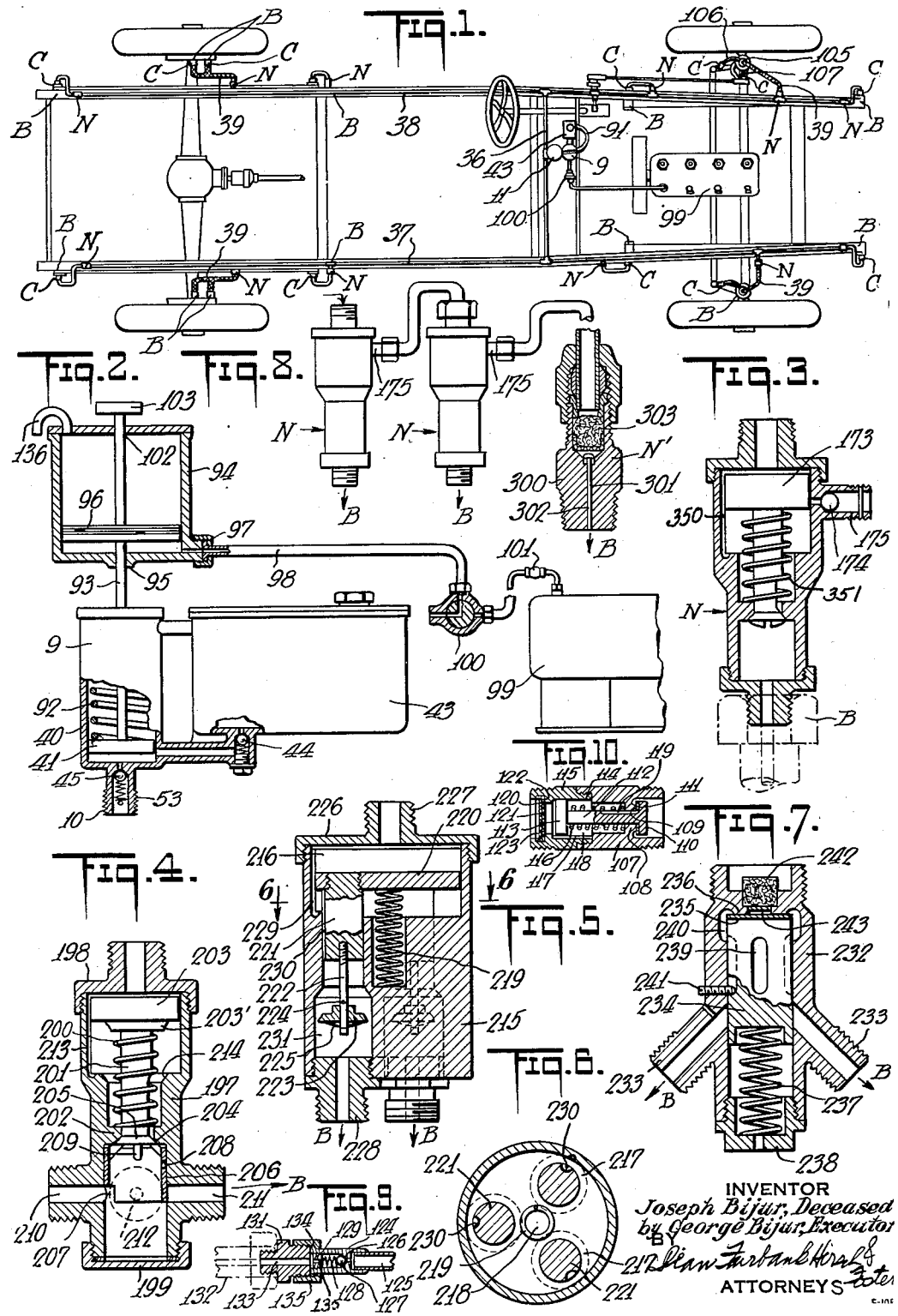
Oct. 13, 1936.  J. BIJUR  2,056,950
LUBRICATION
Filed June 2, 1934
INVENTOR
Joseph Bijur, Deceased
by George Bijur, Executor Patented Oct. 13, 1936

UNITED STATES PATENT OFFICE 2,056,950

LUBRICATION

Joseph Bijur, deceased, late of New York, N. Y., by George Bijur, executor, New York, N. Y., assignor to Auto Research Corporation, a corporation of Delaware Application June 2, 1934, Serial No. 728,719

29 Claims. (Cl. 184—7)

The present invention relates to remote control lubrication and is concerned primarily with systems and installations, and the constituent elements thereof, for lubricating one or more bearings on a machine or group of machines, from a readily accessible point or points of control. The invention has its preferred application to the lubrication of all or most of the bearings on the chassis of a vehicle, such as an automobile or motor truck.

An object is to provide a reliable lubricating installation, more particularly for motor vehicles, the use of which shall not require the exercise of any selective discretion, but in which following the simplest of manipulations, predetermined charges of lubricant may be distributed at a plurality of bearings, whether tight or loose, without overflow.

Another object is to provide apparatus of the above type, the constituent parts of which shall be simple and durable in construction, easy to install, and unlikely to become out of order even after prolonged use.

The invention is primarily concerned with pressure lubricating systems, that, is, with systems in which desired charges of oil are forced under pressure into the bearings.

It may be noted that where in a system of this type, oil is forced from a pump past a plurality of relief valves in parallel to corresponding bearings, unless the resistance to pressure of each line from the pump to a bearing, including the resistances of said bearing and of the relief valve in the line, is substantially uniform, lubricant is likely to be forced, first through the line of least resistance so that pressure is relieved therethrough, and disproportionate charges of oil from the pump cylinder may be supplied to different bearings, some overflowing and others receiving too little oil.

By this invention, there is provided an arrangement for overcoming this objection. In one embodiment of the invention, a lubricant measuring valve is associated preferably with each bearing, to assure a supply thereto, upon operation, of the predetermined measured quantity of lubricant. The measuring elements may be in the form of automatic pressure-operated measuring valves.

To assure the regular functioning of the lubricant measuring elements, it is preferred to maintain the lubricant lines from the pump to the bearings filled with oil at all times. This result is accomplished by the use of pressure-operated relief valves, which may be associated in a unitary structure, with the measuring valves, particularly, where the latter are adjacent or at the bearings. To assure effective seating of the relief valves, it is preferred to employ means for eliminating solid particles of dirt and chips from the lubricant before the latter reaches the relief valves, whereby the oil is free of solid particles in its flow from the source of pressure to the plunger, but is propelled at sufficient speed to operate the measuring valve.

In the accompanying drawing in which are shown some of various possible embodiments of the several features of the invention, Fig. 1 is a diagrammatic view of one form of chassis installation, Fig. 2 is a detail view, partly broken away, of the pump employed in Fig. 1, Fig. 3 is a view in longitudinal cross-section of one form of a measuring valve, Figs. 4, 5 and 7 are alternative forms of measuring valves, Fig. 6 is a transverse sectional view taken along the line 6—6 of Fig. 5, Fig. 8 shows several of the valves of Fig. 3 connected in series to a drip plug outlet to another bearing or returning to the reservoir, Fig. 9 shows a longitudinal sectional view of a check valve which may be employed, and Fig. 10 shows a measuring valve in longitudinal section which may be used at the end of the line.

In Fig. 1 is shown a diagrammatic view of a chassis lubricated by the hand or automatically operated pump 9, shown in Fig. 2. The outlet 10 of the pump 9 is connected through a filter 11 to a single pipe or header 36 extending across the chassis which, in turn, feeds pipes or mains 37 and 38 on either side of the chassis and running lengthwise thereof. Measuring valve appliances N, such as shown in Figs. 3 to 7, are supplied from these pipes, to lubricate bearings on the frame and flexible branches 39 lead to similar measuring valve appliances for the bearings on the axles, the piping being preferably solid metal tubing constructed and arranged as shown in detail in Patent No. 1,632,772 granted on the 14th day of July 1927.

The pump illustratively shown in Fig. 2 comprises a cylinder 40 within which is a piston 41 maintained normally in pump-discharging position by the expansion of a coil spring 92. The cylinder is connected to or cast integral with a pump reservoir 43 communicating at the bottom through a check valve 44 of any appropriate construction, and the usual outlet check valve 45 is provided near the outlet of the pump.

If oil carrying solid particles were supplied to the bearings, the check valves to be hereinafter described, by which the lines are maintained full, might be rendered inoperative by lodging a particle of dirt which may prevent complete seating of the valve.

This difficulty is remedied by the provision of appropriate filtering means adjacent the pump as indicated at 11 in Fig. 1 to intercept solid particles. Since, as heretofore noted, it is desired in the present system to cause the oil to enter the bearings under pressure, it is preferred to employ a filter of relatively low resistance, so that with the application of moderate pressures at the pump, there will be ample pressure at the bearing after the drop of pressure potential in the filter and in the length of the line.

The pump of Fig. 2 may be charged by engine compression to store energy in spring 92, the expansion of which effects the discharge. The prolongation of the piston stem 93 extends into a cylinder 94 through a stuffing box 95 and carries a piston head 96 movable in said cylinder. The lower end of the upper or charging cylinder is provided with a boss 97 to which is attached a pipe 98 connected at its opposite end to the top of one of the gas engine cylinders 99. A two-way valve 100 normally connects the charging cylinder with atmosphere, as shown, and may be turned by hand or automatically at desired intervals to connect said charging cylinder with the engine cylinder. The check valve 101 in the line adjacent the engine cylinder allows the passage of compressed gas from the engine to the charging cylinder, while preventing reverse flow from the charging cylinder during the suction stroke of the engine cylinder.

The piston stem 93 continues up through an aperture 102 in the cover of the charging cylinder and its end is provided with a handle 103 by which the pump may be manually charged, if desired, or required.

In the chassis of Fig. 1 there are shown measuring valve appliances N (shown in detail in Figs. 3 to 10) disposed in the run of the line near the bearings, but if desired, they may be directly connected to the bearings.

Although the measuring and check valve fittings shown by N and C may be used at each bearing B in the line, and if desired in series, as shown in Fig. 8, they are shown in Fig. 1 connected at the spring shackles and spring bolts, each for supplying a single spring shackle or bolt. The two brake links upon each rear wheel are supplied in parallel from a single measuring valve N. At the left front of the vehicle is shown a measuring valve N feeding a swivel 105 on top of the king pin, two pipes 106 and 107 leading from the swivel to adjacent bearings B on the steering knuckle and third arm respectively. A relief valve C is preferably provided immediately in advance of each of the three bearings. The charge passed by measuring valve N thus is divided and a portion flows past each of the relief valves to the associated bearing B.

The check valve fitting C at the end of the line is shown in Fig. 9. This fitting includes an element 124 telescoped over and soldered to the end of the oil feeding line 125. The interior of element 124 is bored with a hole providing a conical seat 126 for valve 127 urged to seating position by a spring 128 held under compression by a plug 129 threaded into element 124 and having a hole 130 drilled therethrough. A plug 131 is threaded into the bearing 132 and has a longitudinal bore 133 for the oil. The element 124 has a flange 134 clamped against plug 131 by union nut 135 in the manner shown in the drawing.

To operate the installation shown in Figs. 1 and 2, the two-way valve 100 is turned by the operator or automatically, whereupon the compression and explosion pressure on top of the gas engine cylinder 99 is transmitted through the check valve 101 and small pipe 98 into the charging cylinder 94. The check valve prevents the compressed gas from returning to the cylinder of the gas engine and thus the compressed gas lifts the power piston head 96 to the upper end of its stroke against the resistance of spring 92. When this has occurred, the two-way valve is released, which is returned by its spring (not shown) to the original position, shown in the drawing, whereupon the gas contents of the charging cylinder below the piston head escapes through the valve 100 to atmosphere, as spring 92 expands to urge the pump piston and power cylinder head downward in discharging the pump, while air enters through the atmospheric connection 136 at the top of the charging cylinder. By locating the two-way valve below the charging cylinder and below the top of the gas engine, as shown, any moisture that may have been contained in the compressed gas is free to drain out into the air through the two-way valve 100.

When pressure is transmitted from the pump to the mains, the fittings N will discharge a measured quantity of lubricant to the associated bearings B.

The appliance of Fig. 3 is arranged to feed a measured quantity through one outlet and the excess to another or other bearings, past a measuring valve N or check valve C, the passage to which is opened after the measured charge has been expelled. The measuring valve portion of this fitting, shown diagrammatically, is preferably substantially identical with that of Fig. 10, which will be described in fuller detail subsequently. The piston 173 normally seals the outlet to relief valve 174 in a nipple 175, projecting laterally from the fitting. The relief valve is exposed when the piston reaches the bottom of the stroke, so that the excess is ejected therethrough to the bearing.

The chassis installation herein described may also be provided with additional fittings N and/or C for supplying lubricant at places other than those indicated in the drawing. For instance, in vehicles provided with brakes on the front wheels, as well as on the rear wheels, measuring valves or seepage fittings may be provided for the front brake links and supplied from the pressure mains in the embodiments of Fig. 1. Lubricant may also be supplied in a similar manner at the rubbing surface of the leaf springs.

The various constructions of measuring valves herein described, are, of course, not limited in their applications in the specific relation shown in the drawing, which is largely illustrative, but each of these fittings is of general application to substantially any bearing or bearings. In general, however, where a single pump cylinder concurrently supplies a plurality of bearings, measuring valve appliances are preferably employed, to limit the charge to each bearing, supplying one or a series of contiguous bearings, the pump cylinder itself constitutes the master measuring element and the lines are kept full by simple relief valve terminals, as in Fig. 9, or which may be included in the measuring valve structure.

The device shown in Fig. 4 furnishes a measured quantity of oil to several pipes in succession, which pipes lead to neighboring bearings. This device consists of a fitting 197 having a cylindrical end closed by a cap 198 threaded to receive the inlet pipe and closed at the opposite end by cap 199. A spring 200 encircling piston stem 201 reacts against neck 202 of the fitting and urges the piston head 203 toward cap 198. The forward portion of neck 202 is formed into a valve seat 204 and the advanced end of the piston stem 201 is enlarged to form a relief valve 205 which fits on and is urged against the valve seat by the expansion of spring 200. The relief valve 205 is connected with a cylindrical slide valve 206 having ports 207, 208 and 209, which in succession, register respectively with nipples 210, 211 and 212 threaded for connection to pipes which lead to the bearings. The cylinder in which the piston head slides is provided with a groove 213 extending down into the lower end of the cylinder, through which oil enters the cylinder, so that the latter is normally filled. As the hollow cylindrical slide valve 206 is moved down by pressure transmitted through the oil, overcoming spring 200, relief valve 205 opens and oil escapes past said valve to the chamber therebelow.

Oil passes from the chamber first through the left-hand nipple 210 until the motion of the slide valve closes its outlet, whereupon the next quantity of oil passes through the port 208 into the right-hand outlet 211 and after this is closed by further motion of the slide valve, another charge passes into the outlet 212 shown in dotted lines as behind the fitting. At the end of the stroke, a conical valve 203' below the piston head enters and seals the valve seat 214 into which it fits, thus preventing further escape of oil. When the pressure in the entering line falls, so that the spring can push the piston up, the piston moves up and oil flows past it through the groove 213 in the side of the cylinder, filling the cavity below the piston head, further escape of oil through the groove being prevented when the valve 205 at the bottom of the piston stem seals the valve seat into which it fits.

In Figs. 5 and 6 is shown a measuring device for forcing measured quantities of oil to three outlets simultaneously. This device consists of a fitting block 215 having a cylindrical cavity 216 at one end and bored with three longitudinal holes 217, and one at 218 of smaller diameter, as shown, communicating with the cylinder 216. The central hole 218 extends only part way through the casting and contains a coil spring 219 for urging upward the piston head 220 which fits into the cylinder 216 and to which are threaded three solid pistons 221 which fit respectively into the three other holes 217. Into the other end of each of the solid pistons is screwed a stem 222 carrying at its lower end a valve head 223 urged toward a stop pin 224 in the stem by a dished washer spring 225.

By reason of the yielding mount of valves 223, seating thereof is assured even though there be small irregularities in machining. The upper end of the cylinder 216 is closed by the threaded cap 226 having an extension 227 threaded to receive the inlet pipe, and the lower ends of cylinders 217 are closed by individual outlet plugs 228. A groove 229 extends down the side of the cylinder and somewhat into the end of the cylinder, as shown, substantially as in Fig. 5, and each of the solid pistons has a longitudinal groove 230 to communicate with the valve chamber 231 therebelow.

Upon application of pressure at the pump, oil depresses the piston head 220 and with it the three solid pistons 221. As the latter move down, they expel the oil within the cylinders 217 past the now open valves 223 into chambers 231 from which the oil passes through outlet plugs 228 to the bearings. At the end of the stroke, the piston head 220 seats upon and seals the cylinders 217, so that no more oil enters and the valves 223 seat upon the outlet plugs 228 and seal the three outlet passages, so that no further oil escapes to the bearings, the latter receiving merely the measured quantity. When the pressure falls sufficiently to permit the spring 219 to lift the piston head, oil flows through the groove 229 at the side of the main cylinder into the cavity below the piston head. Oil further flows through grooves 230 in the sides of the solid pistons 221 into the cavities 231 below them, so that when the piston head is at the top of its stroke, and valves 223 are seated, the space in the cylinders between the solid pistons and the seated valves is filled with oil, to be delivered to the bearing for the succeeding charge.

Another form of measuring valve appliance is shown in Fig. 7. A cylindrical pipe fitting 232 has a plurality of integral lateral outlet nipples 233 for distribution of lubricant to the bearings and encloses a sliding piston 234 having a yielding seating end 235 similar to the relief valves already described, urged against valve seat 236 formed integral with the fitting, by a coil spring 237 reacting against the closure plug 238, which is threaded into the end of the fitting. The piston 234 has a plurality of measuring cavities 239 in the side thereof normally maintained out of registry with the outlet nipples 233, the upper ends of said cavities being normally in communication with the circumferential groove 240 in the fitting. A pin 241 through the fitting extends into one of the cavities 239 to retain the piston against rotary displacement.

In the inlet end of the fitting, preferably adjacent the valve seat, I provide a felt plug 242 serving as a screen to prevent the entry into the fitting of any solid particles picked up in the line, this plug being preferably backed by a small mesh metal screen 243, to intercept any hairs released from the felt in operation.

In operation, as pressure is applied to the fitting, the valve 234 moves against the opposition of spring 237 away from seat 236, interrupting communication between the groove 240 and the cavities 239 and bringing said cavities into registry with the outlet nipples 233 through which the predetermined charge of oil in each cavity escapes by gravity to the corresponding bearing. When the pressure is released, spring 237 expands, effecting return movement of the valve, during which lubricant flows past the open relief valve through the groove 240, to refill the cavities 239 until the valve is reseated, as shown in the drawing, to maintain the line in advance thereof filled with oil.

The measuring valve of Fig. 10 comprises a pipe fitting 107 having a transverse interior ledge 108 affording a seat 109 for a valve 110 provided preferably with the varnished silk or cambric and oil paper seating surface 111.

The valve has a stem 112 at the end of which is a piston 113 slidable in a cylinder portion 114 on a fitting section 115 threaded to the fitting element 107. A coil spring 116 encircles shank 112 and normally maintains the valve 110 against its seat 109. A groove 117 in the cylinder 115 allows the entry of the lubricant when the appliance is in the idle position shown in the drawing, into the chamber 118 between piston-head 113 and seated relief valve 110. The valve stem 112 is provided with a longitudinal groove 119 terminating between the ends of the stem through which the lubricant can pass when the valve is unseated in operation.

In advance of the piston 113 at the intake end of the fitting, I provide straining means to intercept any solid particles picked up in the line. In this embodiment, is shown a straining means comprising a disk 120 of felt. Preferably an extremely fine-wire mesh screen 121 is disposed behind the felt disk 120 and is clamped against the retaining shoulder 122 by pressure transmitted through the felt 120 from the split ring 123, which retains the strainer in position. The wire mesh screen serves to intercept any fine hairs that may be released from the felt and thereby prevents any possibility of such hairs finding their way to the valve seat 109 and interfering with the effectiveness of the relief valve.

After charging the pump, the pump piston 41 is urged downward in its cylinder, forcing out the charge of oil past relief valve 45 and through the filter head 11 therebelow, in which any small particles of dirt are abstracted, the pressure from the pump being transmitted throughout the length of the header 36 and the main lines 37 and 38. The pressure is thus transmitted to all of the measuring fittings shown in Figs. 3 to 10 and the location of which in the installation is indicated by letter N in Fig. 1.

The pistons 173, 203, 220, 234 and 113 of each measuring valve are displaced by the applied pressure against the resistance of the spring in Fig. 3 and springs 200, 219, 237 and 116 to unseat the check valves 127 and 110 and to force a definite charge of oil through the outlet nipples to the bearings. The discharge is limited when pistons 173, 203, 220 and 113 of Figs. 3, 4, 5 and 10, respectively, seat against the respective ends of their cylinders, and when the end of the groove in which screw 241 is engaged, contacts said screw in Fig. 7, the excess of the pump charge beyond the combined volume of the measuring valves being forced through by-pass 91 (Fig. 1) to the pump reservoir 43, a drip plug and/or check valve (not shown) being provided in said by-pass, if desired, to relieve the lines of the excess lubricant after all of the pressure valves have been supplied. Upon cessation of the pressure at the pump, springs 351, 200, 219, 237 and 114 expand to reseat the check valves to close each line against leakage of oil, the pistons of the measuring valves having a fit sufficiently loose or provided with leakage grooves 350, 213, 230 and 117 to permit the passage of oil therebeyond to refill the measuring compartment.

It will be seen in the system set forth, that each bearing is supplied independently with a definite measured quantity of lubricant without excessive overflow, regardless in what manner the pump is charged, that is, regardless of whether the pressure transmitted through the line rises gradually to its maximum or slowly. This operation results from the fact that the pistons of the measuring valves of Figs. 3, 4, 5, 7 and 10 reliably seal the line against further egress of oil to the bearing as soon as the measured quantity has been delivered thereto.

In releasing the pistons to permit their return, drip plugs designated at N' in Fig. 8 may be employed in the various portions of the lubricating system connected to a bearing, or a drip plug N' may be utilized in the by-pass 91 back to the reservoir. In the first case the bearings will receive the lubricant discharged by the drip plug while in the second case this lubricant will be returned to the reservoir through the drip plug.

These drip plugs are more fully described in application Serial No. 580,668, filed August 9, 1922, Patent No. 1,975,920 and in Patents No. 1,632,771 and No. 1,632,772. They consist of brass fittings 300 having central passages 301 which central passages may be substantially completely filled by the pin restriction 302. An inlet filter 303 protects the drip plug from dirt particles in the line.

As shown in Fig. 8, two measuring valves N are connected in series with the outlet 175, one measuring valve supplying the inlet nipple of the last measuring valve. If desired, the last measuring valve N in the series of Fig. 8 may be connected to an end measuring valve, such as shown in Fig. 3 with the outlet member 175 closed, as shown in Fig. 10. However, the construction shown in Fig. 8 in which the last valve is connected to a drip plug N' is also quite satisfactory, the drip plug relieving the excess lubricant and pressure in the line to permit the pistons 173 to return and also feeding an additional bearing.

The present application is a continuation in part of application Serial No. 596,856, filed October 25, 1922 Patent No. 2,017,848, and is continued in part in application Serial No. 82,750, filed June 1, 1936, said latter application being particularly directed to the embodiment of Figs. 5 and 7, and said former application being particularly directed to the embodiment of Fig. 10.

What is claimed is:—

1. A fluid measuring device comprising a body having a cylindrical bore therein and provided with an inlet and two outlet ports, a single valve operable upon a fluid pressure impulse to move from normal position and force fluid from said bore through one of said outlet ports and subsequently to establish communication between said inlet port and the other outlet port, and resilient means to return said valve to normal position.

2. A pressure lubricating system comprising a plurality of machine elements to be lubricated, supply means for delivering lubricant under pressure, and control devices connected therewith, one of said devices including a pressure operated measuring piston and operating first to deliver a measured quantity of lubricant to its element and second to cut off its element and open communication to the next device, said first mentioned control device including a fixed cylinder element and a reciprocating piston element, said piston contacting with the walls of said cylinder and upon its discharge stroke delivering said measured quantity of lubricant, said piston consisting of a single unitary piston element.

3. A lubricant measuring device having a casing with an inlet and two outlets, a single unitary integral piston mechanism in said casing operated by pressure fluid entering said inlet, for delivering a predetermined charge through one outlet and then closing the same and placing the other outlet in open communication with said inlet as long as the pressure is maintained, and spring means for returning said mechanism to initial position when the pressure is relieved.

4. A lubricating system comprising a plurality of elements to be lubricated, a source of lubricant under pressure, a single conduit connecting said source with said elements in series and a single unitary integral piston measuring valve means operable automatically upon discharge of lubricant under pressure from said source to said first element and then successively to the remaining element.

5. A lubricating system comprising a plurality of elements to be lubricated, a conduit connecting said elements in series, a source of lubricant under pressure, and a single unitary integral piston measuring valve means operable automatically upon discharge of lubricant under pressure from said source to said conduit to supply a measured charge from said source to the first of said elements and then successively to the remaining element.

6. In a lubricating system, a metering valve device having a casing with a cylindrical bore, an inlet port to said bore and two outlet ports from said bore, a cylindrical piston unit in said bore having substantially the same diameter as said bore, the periphery of the piston unit contacting with said bore, said piston unit being displaceable in one direction by the introduction of lubricant under pressure through said inlet port and during such displacement causing a measured discharge of lubricant from said bore through one of said outlet ports, and also uncovering the second outlet port to permit flow of lubricant from said inlet port to said second mentioned outlet port through said bore and coil spring means to return said piston after said displacement, said bore being of a diameter sufficient to permit slow by-passage of lubricant around said piston unit when returned by said coil spring means.

7. In a lubricating system, a metering valve device having a casing with a cylindrical bore, an inlet port to said bore and two outlet ports from said bore, a cylindrical piston unit in said bore having substantially the same diameter as said bore, the periphery of the piston unit contacting with said bore, said piston unit being displaceable in one direction by the introduction of lubricant under pressure through said inlet port and during such displacement causing a measured discharge of lubricant from said bore through one of said outlet ports, and also uncovering the second outlet port to permit flow of lubricant from said inlet port to said second mentioned outlet port through said bore and coil spring means to return said piston after said displacement, said bore being of a diameter sufficient to permit slow by-passage of lubricant around said piston unit when returned by said coil spring means, said inlet port being at one end of the bore, the second mentioned outlet port being at the side of the bore and first mentioned outlet port being at the other end of the bore.

8. An automobile pressure lubricating system comprising a plurality of machine elements to be lubricated, supply means for delivering lubricant under pressure, and valve control devices, each device normally cutting off all devices more remote from the supply and operating first to deliver a measured quantity of lubricant to its machine element and second to open communication to the next device, and a highly restricted relief means having a fixed obstructing effect connected to the last device and feeding one of said machine elements, said last mentioned device permitting gradual reduction of lubricant pressure in said system after operation of each of said devices, whereby said devices may return to their original position to be ready for the next delivery of lubricant under pressure.

9. A pressure lubricating system comprising a plurality of machine elements to be lubricated, supply means for delivering lubricant under pressure and a series of devices comprising control devices, each control device normally cutting off all devices more remote from the supply and operating first to deliver lubricant to its bearing and second to establish an operative connection with the next device, and highly obstructed fixed restriction relief means at the end of the conduit to the supply means, said relief means relieving lubricant pressure from said system following the operation of the most remote device and permitting all of said devices to return to their original positions upon cessation of pressure at said supply means.

10. A lubricant measuring device having a casing with an inlet and two outlets, piston mechanism in said casing operated by pressure fluid entering said inlet, for delivering a predetermined charge through one outlet and then closing the same and placing the other outlet in open communication with said inlet as long as the pressure is maintained, and means for returning said mechanism to initial position when the pressure is relieved including a leakage passing along the periphery of said piston, said passage taking the form of a recess on the interior side of the casing.

11. A lubricant measuring device having a cylindrical casing with an inlet and two outlets, and mechanism in said casing operated by pressure fluid entering said inlet, for delivering a predetermined charge through one outlet and then closing the same and placing the other outlet in open communication with said inlet, said inlet being at one end of the casing, one outlet being at the other end, and the other outlet being at the side of the casing.

12. A lubricant measuring device comprising a casing having an inlet and two outlets, a valve axially slidable in said casing, a piston slidable in said casing, a spring urging said piston toward said inlet, and a rigid mechanical connection between said piston and said valve, said valve controlling one of said outlets, and said piston when moved away from the inlet controlling the other outlet.

13. A lubricant measuring device comprising a closed body normally containing lubricant and having three ports, two of said ports being connected to parts to be lubricated, and movable valve means in said body operable upon forcing lubricant under pressure into said body through the third of said ports to force a predetermined quantity of lubricant from said body through one of said two ports to one of the parts to be lubricated and thereafter opening a passageway through said body to the other of said two ports, thereby to permit flow of lubricant from said third port through said body and said other of said two ports, said first two ports being each provided with a check valve.

14. A lubricant measuring device adapted to be connected with a remote part to receive lubricant, comprising a cylindrical casing having an inlet and two outlets, means for connecting one of said outlets to a near part to be supplied with lubricant, the other of said outlets being adapted to be connected to said remote part, and said inlet to a source of lubricant under pressure, and means in said casing operative upon reception of lubricant under pressure through said inlet to force a measured charge of lubricant to said part through one of said outlets to the near part and to connect said inlet with the other of said outlets to the remote part, said inlet and outlets being positioned respectively at the opposite ends and at the side of said casing.

15. A lubricant charge measuring device for use in a central lubricating system, comprising a cylindrical chamber, means for connecting said chamber with a plurality of bearings to be lubricated, a piston valve reciprocable in said chamber, a cap secured at the upper end of said chamber, resilient means for forcing said valve toward said cap, an inlet port in said cap, a plurality of outlet ports for said chamber closed when said valve is in its uppermost position, means to seal at least one of said outlet ports when the valve is in its lowermost position, and means permitting a slow by-pass of lubricant round said valve when it is forced upwardly by said resilient means.

16. A measuring device for use in a central lubricating system comprising a cylinder having an inlet port and two outlet ports, and a piston valve reciprocable in said chamber, said valve having an elongated axial projection adapted to close one of said outlet ports, said valve being adapted to force lubricant from said chamber to said one of said outlet ports upon supplying lubricant under pressure through said inlet port, and subsequently to open the other outlet port.

17. A lubricant charge measuring device for use in a central lubricating system, comprising a cylindrical chamber, means for connecting said chamber with a bearing to be lubricated, a piston valve reciprocable in said chamber, a cap secured at the upper end of said chamber, a spring for forcing said valve toward said cap, an outlet port in said chamber open only when said valve is in its lowermost position, and means to seal the connection to the bearing when the valve is in its lowermost position, said chamber being of a construction to permit slow by-passage lubricant around said valve when forced upwardly by said spring.

18. A lubricant measuring device having a casing with an inlet and two outlets, and a single element in said casing operated by the pressure of fluid entering said inlet, for delivering a predetermined charge through one outlet and then closing the same and at approximately the same time placing the other outlet in open communication with said inlet.

19. In a system of the class described, the combination of a plurality of machine elements to be lubricated, lubricant measuring devices associated with said elements, a lubricant reservoir, a lubricant pump communicating therewith, conduits connecting said devices in series to said pump, means in each of said devices adapted to cut off flow of lubricant to the devices following in the series until charges of lubricant have been forced into their associated elements, and relief means operable upon flow of lubricant from the last device of said series including a highly restricted flow conduit means permitting return flow to said reservoir automatically after operation of said last device, said highly restricted flow conduit affording a continuously open nonvalved passage back to the reservoir of substantially fixed restriction.

20. A fluid measuring device comprising a body having a cylindrical bore therein, an inlet port and two outlet ports in said body, and a single valve reciprocable in the bore of said body and spring pressed to close both outlet ports and adapted successively to uncover the first of said outlet ports, and then to open the second outlet port upon a fluid pressure impulse applied at said inlet port, and subsequently to close the second outlet port, and then close the first outlet port when said fluid pressure is relieved.

21. A fluid measuring device comprising a body having a bore therein, an inlet port and two outlet ports in said body, a single valve element movable in said bore to uncover one of said outlet ports, and then the other outlet port upon application of fluid pressure and subsequently to close said last-named outlet port, and then close the first-named outlet port, in this predetermined sequence upon the relieving of said fluid pressure.

22. In a system of the class described, the combination of a plurality of machine elements requiring lubrication, a charge measuring progressive measuring valve device associated with each of said elements and having an outlet port to said respective element, conduit means connecting said devices in series, a source of lubricant under pressure connected to the first device of the series, each of said devices having a second outlet port opened after discharge through said first outlet port connected to the inlet port of the device next in series, and a drip plug affording a fixed high restriction in the line of flow from the second outlet port of the last device of the series to permit extrusion of lubricant to a suitable place of disposal and to relieve pressure in said device and permit return thereof, said drip plug serving slowly to feed lubricant during continuation of pressure application from the source after operation of said last device and then serving slowly to relieve lubricant pressure in the conduits permitting return of the devices after cessation of pressure application from the source.

23. In a centralized lubricating system, a measuring valve device having a casing provided with an interior chamber, a piston in said interior chamber, an inlet port feeding lubricant under pressure to said piston and a plurality of outlet ports successively supplied with lubricant under pressure by said piston.

24. In a centralized lubricating installation, a measuring valve device provided with a casing having an interior chamber receiving a piston making discharging and return strokes, a single inlet port and a plurality of outlet ports, said inlet port feeding lubricant under pressure to said piston, and valve means actuated by said piston to successively open and close said outlet ports upon its discharging stroke.

25. In a lubricating system, in combination, a plurality of bearings, a distributor valve including a discharging metering piston, bearing conduits connecting said distributor valve to said bearings, an intermittently discharging pump remote from said distributor valve, a pump conduit connecting said pump to said distributor valve and a return spring for said piston, said piston being moved forwardly to discharge position upon discharge from said pump into said pump conduit, said distributor valve being provided with a plurality of outlet ports, one to each bearing conduit, said piston discharging directly into at least one of said outlet ports and uncovering another outlet port during its discharge movement, whereby a discharge will take place therethrough from said pump conduit.

26. A pressure lubricating system comprising a plurality of machine elements to be lubricated, a single conduit communicating with all said elements, supply means for delivering lubricant under pressure to one end of said conduit, and a valve control device in the conduit adjacent one of said elements, said device normally cutting off that portion of the conduit more remote from the supply and operating under a pressure impulse first to deliver a measured quantity of lubricant to its own element and second to cut off its element and simultaneously open the conduit beyond, said control device including a fixed cylinder element and a reciprocating piston element, said piston contacting with the walls of said cylinder and upon its discharge stroke delivering said measured quantity of lubricant, said piston consisting of a single unitary piston element.

27. A pressure lubricating system comprising a plurality of machine elements to be lubricated, a single conduit communicating with all said elements, supply means for delivering lubricant under pressure to one end of said conduit, and a valve control device in the conduit adjacent one of said elements, said device comprising a reciprocable piston valve member normally cutting off that portion of the conduit more remote from the supply and operating under a pressure impulse first to deliver a measured quantity of lubricant to its own element and second to cut off its element and simultaneously open the conduit beyond, said control device including a fixed cylinder element and a reciprocating piston element, said piston contacting with the walls of said cylinder and upon its discharge stroke delivering said measured quantity of lubricant, said piston consisting of a single unitary piston element.

28. A measuring valve construction comprising an elongated cylindrical-like body having an upper chamber and a lower chamber, a piston displacement measuring valve device in the upper chamber, a connecting passage of reduced diameter between the upper chamber and the lower chamber, said piston being provided with a stem extending through said passage, and the lower part of said stem and the lower part of said passage being respectively provided with cooperating valve and valve seat means, a coil spring device to bias the piston upwardly to one end of the upper chamber and an inlet cap attached to the top of said cylindrical-like body containing a threaded inlet nipple connection, said stem being of such length and said valve and valve seat means stopping upward movement of the piston when it is adjacent but slightly spaced and out of contact with said cap, said construction including a bottom seat for the piston valve device at the bottom of the upper chamber and a groove means extending longitudinally in said upper chamber the entire length thereof to below said bottom seat to permit leakage past the piston in said upper chamber when said piston is returned by said coil spring, said cylindrical-like body being provided with a plurality of outlets through one of which at least the lubricant is forced by downward movement of said piston against said spring, flow through said passage being cut off upon return of said piston by cooperation between said valve and said valve seat means, said piston controlling the sequence of flow through said outlets, and the discharge pressure and quantity of lubricant discharged through at least one of said outlets.

29. In a lubricating installation, having a reservoir, a piston pump supplied from said reservoir, a conduit leading toward bearing means and means for actuating said pump to intermittently discharge lubricant into said conduit, a measuring valve fitting unit having an elongated cylindrical body with threaded inlet nipple means for connection to said conduit and threaded outlet nipple means for connection to said bearing means, said body including a relatively large diameter cylindrical chamber inlet port means in said inlet nipple means and outlet port means in said outlet nipple means, a reciprocating piston valve consisting of a substantially solid metal cylinder provided with a return spring in said chamber, the sides of which piston have a metallic contact with the walls of said chamber, said piston valve closely fitting therewithin with sufficiently small clearance to permit leakage of lubricant thereby between the sides of the piston and the walls of the chamber, whereby said return spring may return said piston displacing the lubricant from the inlet side of the piston to the outlet side through said clearance, said piston subsequently moving forwardly against said spring to carry forward said displaced lubricant and to cause it to flow outwardly through said outlet port means upon intermittent pressure application to its inlet face by said pump, said outlet port means including a plurality of outlet ports leading to different bearings, said unit being provided with means to assure a division of lubricant between said outlet ports upon each pressure movement of said piston valve and cutting off of all of said ports when said piston valve has completed its return stroke.

GEORGE BIJUR,
*Executor of the Estate of Joseph Bijur, Deceased.*